United States Patent [19]

Shintaku

[11] Patent Number: 4,612,045
[45] Date of Patent: Sep. 16, 1986

[54] METHOD FOR MAKING ALUMINUM NITRIDE POWDER

[75] Inventor: Yasuyuki Shintaku, Sennan, Japan

[73] Assignee: Chugai Ro Co., Ltd., Osaka, Japan

[21] Appl. No.: 774,448

[22] Filed: Sep. 10, 1985

[30] Foreign Application Priority Data

Sep. 10, 1984 [JP] Japan .................... 59-190246

[51] Int. Cl.[4] .......................... C22B 21/00
[52] U.S. Cl. .................. 75/68 R; 75/93 R; 148/11.5 A; 156/DIG. 61; 219/76.16; 239/79; 239/83; 373/22; 423/412; 419/47; 419/57
[58] Field of Search .............. 423/412; 419/57, 47; 373/22; 239/79, 83; 219/76.16; 75/68 R, 93 R; 156/DIG. 61; 148/11.5 A

[56] References Cited

U.S. PATENT DOCUMENTS 1,350,149  8/1920  Gerber ................... 423/412
3,307,908  3/1967  Mandorf ................. 423/412
4,104,061  8/1978  Roberts .................. 419/29

Primary Examiner—Stephen J. Lechert, Jr.
Attorney, Agent, or Firm—Wenderoth, Lind & Ponack

[57] ABSTRACT

A method for making an aluminum nitride powder comprises atomizing a molten aluminum into a nitriding atmosphere of $N_2$ gas of elevated temperature and solidifying the finely divided liquid particles of aluminum which have been nitrided.

3 Claims, 1 Drawing Figure

U.S. Patent      Sep. 16, 1986      4,612,045
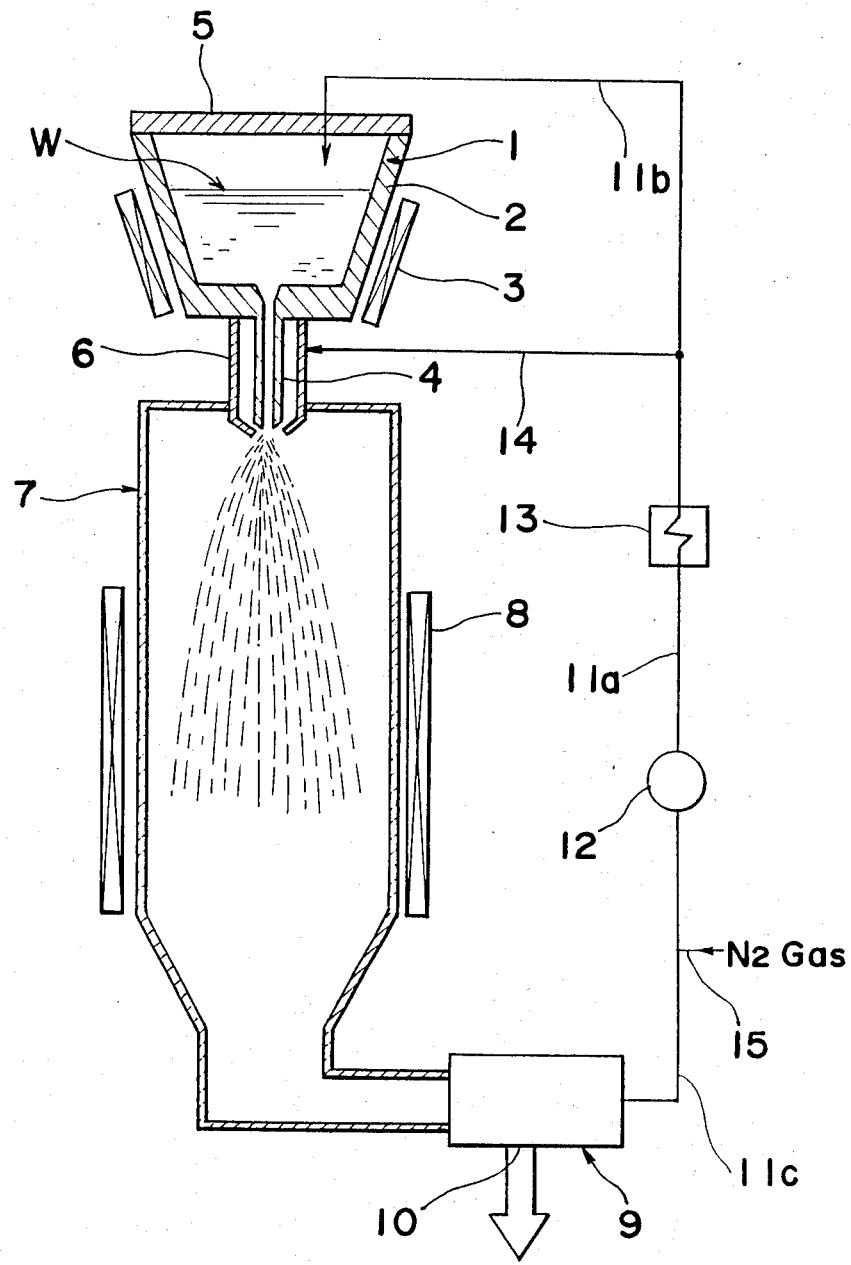

METHOD FOR MAKING ALUMINUM NITRIDE POWDER

BACKGROUND OF THE INVENTION

The present invention relates to a method for making a powder of aluminum nitride.

For manufacturing an aluminum nitride powder, there are many methods well known to those skilled in the art. For example, Japanese Laid-open Patent Publication No. 53-68700, published in 1978, discloses the manufacture by causing an aluminum compound to react with ammonia or the like to produce an aluminum-nitrogen compound which is in turn heat-treated. Japanese Laid-open Patent Publication No. 54-126697, published in 1979, discloses the addition of an aluminum nitride powder to a powdery mixture of alumina and carbon and the subsequent heat-treatment of the resultant mixture in an $N_2$ atmosphere. Japanese Laid-open Patent Publication No. 57-22106, published in 1982, discloses heating an aluminum foil and a carbon paper to 600° C. or higher in a non-oxidizing atmosphere, contacting them with an oxygen containing gas, and finally treating them in an atmosphere containing a mixture of oxygen and nitrogen.

However, since all of the prior art methods are of a batch production system utilizing a gas-solid reaction, not only is the productivity low, but also the method is complicated. In the case of the method wherein the aluminum nitride powder is mixed, not only is the running cost high, but also since the powder is used as one of the raw material, the raw material tends to scatter, posing a problem in that the working environment is contaminated.

SUMMARY OF THE INVENTION

The present invention has been developed with a view to substantially eliminating the above described problems inherent in the prior art methods and has for its essential object to provide an improved method which can be efficiently and effectively practiced to make the aluminum nitride powder at reduced running cost.

To this end, the present invention provides a method for making an aluminum nitride powder in which molten aluminum is atomized by means of high temperature $N_2$ gas into a high temperature $N_2$ atmosphere so that the aluminum nitride powder can be obtained directly from molten aluminum.

BRIEF DESCRIPTION OF THE DRAWING

The sole accompanying drawing illustrates, in schematic longitudinal sectional representation, an apparatus for making the aluminum nitride powder according to the method of the present invention.

DETAILED DESCRIPTION OF THE EMBODIMENT

Referring to the sole accompanying drawing, an apparatus designed to perform the method according to the present invention comprises a melting furnace 1 for accommodating a quantity of a molten aluminum W, an atomizing nozzle 6 and a nitriding chamber 7.

The melting furnace 1 comprises a vessel 2 having a heater assembly 3 exteriorly surrounding the vessel 2 and also has a downspout 4 extending downwards from the bottom of the vessel 2 and into the atomizing nozzle 6 supported from the bottom of the vessel 2 in coaxial relationship to the downspout 4. The vessel 2 has a loading opening at the top thereof, which opening is adapted to be fluid-tightly closed by a lid 5 when and so long as the apparatus is in use. The atomizing nozzle 6 is so designed, and the downspout 4 is so positioned inside and relative to the nozzle 6, that the molten aluminum emerging outwards from the downspout 4 can be atomized by a compressed $N_2$ gas emerging outwards from the nozzle 6 at high velocity.

The nitriding chamber 7 in the form of an upright column has a heater assembly 8 exteriorly surrounding the chamber 7. The atomizing nozzle 6 has its lower end protruding into the chamber 7. The bottom of the chamber 7 is connected to a cooling chamber 9 having a filter or screen (not shown) and an opening 10 for the discharge of the powder.

The apparatus shown is provided with $N_2$ gas recirculating system includng a pipe 11a having one end connected with a discharge port of a compressor 12 and the other end branched into two pipes 11b and 14, the pipe 11b being communicated with the interior of the melting vessel 2 above the level of the molten aluminum W for applying a pressure of the molten aluminum W to urge the latter to flow outwards through the downspout 4 whereas the pipe 14 is communicated with the atomizing nozzle for supplying $N_2$ gas necessary to atomize the molten aluminum then emerging outwards from the downspout 4 into the nitriding chamber 7. The pipe 11a has a heater 13 installed therein for heating the compressed $N_2$ gas to 400°–500° C. thereby to promote the reaction between the molten aluminum and the $N_2$ gas.

The $N_2$ gas recirculating system also includes a pipe 11c having one end communicated with the cooling chamber 9 and the other end with a suction port of the compressor 12. Thus, it is clear that $N_2$ gas used to atomize the molten aluminum into the nitriding chamber can be circulated from the compressor 12 back to the same compressor 12 through the system including the nozzle 6, the nitriding chamber 7 and the cooling chamber 9. However, since $N_2$ gas used to atomize the molten aluminum is consumed in the reaction within the nitriding chamber 7, it is necessary to supplement $N_2$ gas in a quantity required to compensate for the reduction of $N_2$ gas in the system and, for this purpose, the suction port of the compressor 12 is also connected through a supply pipe 15 with a source of $N_2$ gas to be supplemented.

When the aluminum nitride powder is to be manufactured using the apparatus of the above described construction, the nitriding chamber 7 has to be filled with $N_2$ gas as the atmosphere has to be heated by the heater assembly 8 to and be maintained at a temperature not lower than 800° C. On the other hand, a quantity of high purity aluminum is charged into the vessel 2 and heated by the heater assembly 3 to melt within the vessel 2. Subsequently, and after the top opening of the vessel 2 has been closed by the lid 5, the compressed $N_2$ gas is supplied through the pipe 11b into the closed vessel 2 above the level of the molten aluminum W to impose on the molten aluminum W a pressure required to urge the molten aluminum W to flow downwards through the downspout 4 and into the nitriding chamber 7. Simultaneously with the supply of the compressed $N_2$ gas into the vessel 2, the compressed $N_2$ gas is supplied through the pipe 14 into the atomizing nozzle 6.

Therefore, it will readily be seen that the molten aluminum emerging outwards through the downspout 4 can be atomized into the nitriding chamber 7 by the compressed $N_2$ gas blowing at high velocity into the chamber 7 through the nozzle 6. The atomized aluminum, that is, finely divided liquid particles of aluminum, undergoes a liquid-gas phase reaction in the presence of the high temperature $N_2$ atmosphere as they fall through the nitriding chamber 7, and is then collected in the cooling chamber 9. Within the cooling chamber 9, the finely divided liquid particles of aluminum which have passed through the nitriding chamber 7 are cooled to produce a mixture of a powder of aluminum nitride and a powder of metallic aluminum. $N_2$ gas in the cooling chamber is separated from the powder and extracted from the cooling chamber 9 for the recirculation back to both the vessel 2 and the nozzle 6 by way of the compressor 12 and then the heater 13.

It is to be noted that the finely divided liquid particles of aluminum can also be obtained by melting an aluminum wire by the use of a plasma arc or a plasma jet and, simultaneously atomizing the molten aluminum with a compressed $N_2$ gas of elevated temperature.

Hereinafter, the present invention will be illustrated by way of non-limiting examples.

EXAMPLE 1

When the $N_2$ gas of 450° C. had been supplied to the atomizing nozzle while the temperature inside the nitriding chamber had been maintained at 920° C., the powder collected in the cooling chamber was found to have the following composition:
Aluminum: 45 wt%
Aluminum nitride: 55 wt%
Average particle size: 0.1–0.2μ

EXAMPLE 2

When the $N_2$ gas of 450° C. had been supplied to the atomizing nozzle while the temperature inside the nitriding chamber had been maintained at 975° C., the powder collected in the cooling chamber was found to have the following composition:
Aluminum: 40 wt%
Aluminum nitride: 60 wt%
Average particle size: 0.1–0.2μ

EXAMPLE 3

When the $N_2$ gas of 400° C. had been supplied to the atomizing nozzle while the temperature inside the nitriding chamber had been maintained at 970° C., the powder collected in the cooling chamber was found to have the following composition:
Aluminum: 40 wt%
Aluminum nitride: 60 wt%
Average particle size: 0.1–0.2μ

When the powdery mixture of aluminum and aluminum nitride obtained in each of the above Examples 1 to 3 was subsequently heated for a predetermined time in the $N_2$ atmosphere of 1200° to 1500° C., substantially 100% aluminum nitride could be obtained.

From the foregoing full description of the present invention, it has now become clear that, since the aluminum nitride powder can be made directly from the molten aluminum and this can be achieved continuously, not only can the running cost be reduced, but also the production efficiency is very high as compared with that according to the prior art methods.

Moreover, since in the practice of the method of the present invention no powder is employed as a raw material, there is no possibility of formation of aluminum oxide, but high purity aluminum nitride powder can be obtained. Also, since no scattering of the raw material occurs, the working environment is not contaminated.

It is pointed out that since the nitriding which takes place during the execution of the method of the present invention is a liquid-gas phase reaction between the atomized aluminum and the $N_2$ gas, the reaction takes place at a relatively high speed as compared with the solid-gas phase reaction that takes place in the prior art methods, and this makes it possible to use a relatively small apparatus.

Furthermore, the $N_2$ gas recirculating system makes it possible to reduce the running cost of $N_2$ gas.

Although the present invention has been fully described by way of example with reference to the accompanying drawing, it is to be noted here that various changes and modifications will be apparent to those skilled in the art. Therefore, unless otherwise such changes and modifications depart from the scope of the present invention, they should be construed as being included therein.

What is claimed is:

1. A process for making aluminum nitride powder which comprises the step of:
   (a) melting metallic aluminum;
   (b) atomizing the molten aluminum by high temperature $N_2$ gas into an $N_2$ atmosphere of not lower than 800° C., to thereby form atomized particles of aluminum nitride, and
   (c) cooling the atomized particles of aluminum nitride to produce an aluminum nitride powder.

2. The process according to claim 1 wherein the $N_2$ gas atomizing the molten aluminum is compressed.

3. The process according to claim 2 wherein the metallic aluminum is in the form of a wire which is melted by the use of a plasma arc or plasma jet and is simultaneously atomized with said compressed $N_2$ gas.

* * * * *